May 26, 1925.  
H. O. LINDEMANN  
BIRD CAGE GUARD  
Filed June 21, 1924
1,539,583
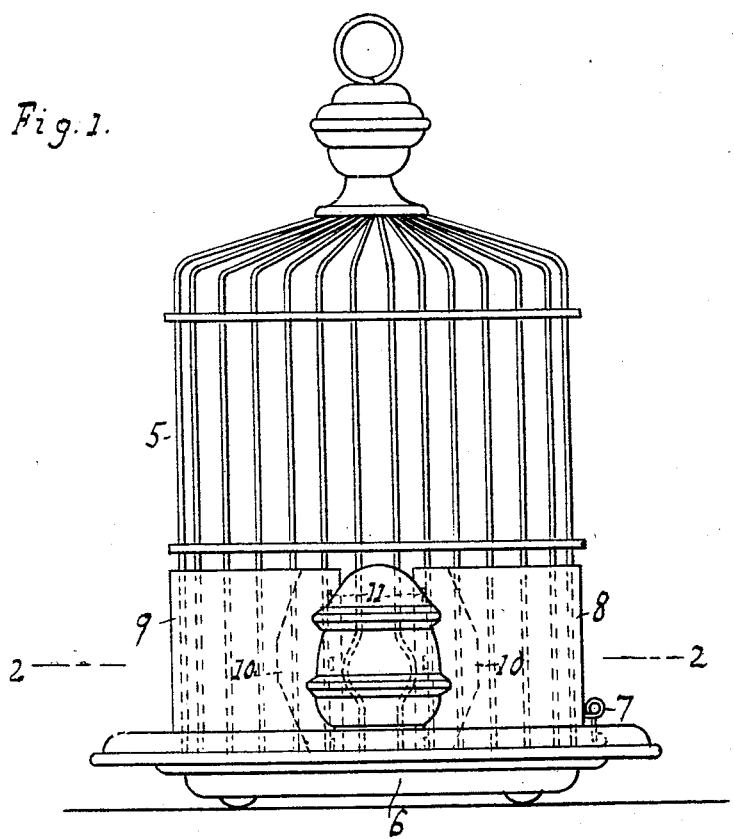
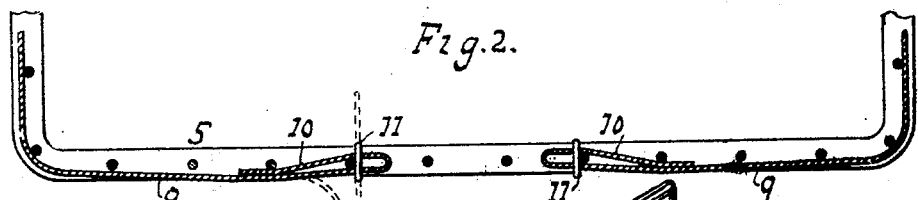
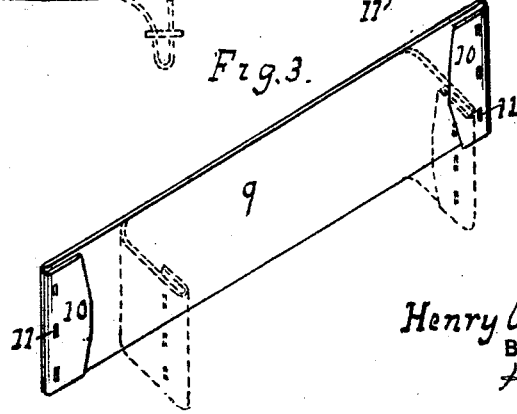
INVENTOR  
Henry O. Lindemann  
BY  
ATTORNEYS Patented May 26, 1925.

1,539,583

UNITED STATES PATENT OFFICE.

HENRY O. LINDEMANN, OF TOMPKINSVILLE, NEW YORK.

BIRD-CAGE GUARD.

Application filed June 21, 1924. Serial No. 721,410.

*To all whom it may concern:*

Be it known that I, HENRY O. LINDEMANN, a citizen of the United States, residing at Tompkinsville, in the county of Richmond and State of New York, have invented new and useful Improvements in Bird-Cage Guards, of which the following is a specification.

This invention relates essentially to a guard for bird cages which is adapted to prevent the seeds, or gravel and other matter from being spilled or thrown out of the cage.

The invention is designed to provide a flexible transparent shield arranged to surround the lower portion of a wire, wicker, bamboo, wood, etc., cage, and means for attaching the shield to the wires by deflecting and hooking the end of the shield over the wire then permitting it to flex into engagement with the wires by its inherent flexibility.

Bird cage guards have heretofore been made of fine wire cloth or glass, the glass being heavy and is easily broken, while the mesh of the wire was so fine that it was almost impossible to observe anything within its area.

It is the object of the present invention to employ a transparent flexible practically unbreakable substance such as thin springy celluloid that permits a free vision of the lower part of the cage, keeps the bird free from draught and at the same time does not perceptibly add to the weight of the cage.

The novel features of the invention are more fully described in the following specification and claims, reference being made to the accompanying drawing in which:

Fig. 1 represents a side elevation of a bird cage embodying this invention.

Fig. 2 is a horizontal section on a larger scale taken along the line 2 2 of Fig. 1, the feed cup and the bottom having been removed.

Fig. 3 is a perspective view of a shield, the dotted lines showing the shape it assumes when connected to the cage.

In the drawing is shown a bird cage of ordinary type having a wire top 5 and a removable bottom 6 which is normally held to the top by a clasp 7 swingingly mounted on the bottom as is well known. A guard or shield constructed of thin flexible material such as celluloid or other transparent resilient substance includes two sections 8 and 9 conforming to the profile of the wire cage. These sections substantially surround the lower portion of the wire top and practically prevent any gravel or any other substances from accidentally moving out of the cage. The guard is made of uncolored transparent celluloid, but it could be colored or tinted and thus rendered somewhat translucent. Each section is substantially flat before it is mounted on the cage as indicated in Fig. 3, so that a number can be piled together and readily packed for transportation.

Each end portion of a section is provided with a flap or lap 10 made by turning the ends of the section inwardly. A series of staples 11 arranged near the looped or apex part of the flap secure the flap to the body of the shield and at the same time serve as stops to coact with one of the vertical wires of the cage.

When it is desired to arrange the shield about the cage the body near the end is slightly bent and the free end of the flap is slid along the wire as indicated in dotted lines in Fig. 2, then pushed until the staples strike the vertical wire and the body by its inherent flexibility deflects back to its normal position with the staples in close contact with the wire. The end of the flap as seen in Fig. 2 is snapped between the wire and the body of the shield so as to give it a locked grip, keep the bird from pecking at it, give a closed joint to prevent lodgement of dirt into the crack and permit of nesting one size cage into another in shipping to save space without the locking end of flap sticking out at an angle to prevent nesting. The staples permit the shield to be drawn tightly about the wires without breakage or injury to the flap or the apex portion of the composition. The shield can readily be removed even while the cage is suspended merely by bending the looped end at right angles and pulling it outward.

I claim:—

1. A bird cage guard comprising a flexible shield for arrangement about the lower portion of a cage, and means for hooking the shield to a member of the cage by deflecting its end, said means by its inherent resiliency can be unhooked to remove the shield.

2. A bird cage guard comprising a flexible shield for arrangement about the lower portion of a wire cage, and a flap located at the end of the shield made to hook about a vertical wire of the cage, the flap by its inherent resiliency can be unhooked to remove the shield.

3. A bird cage guard comprising a flexible shield for removable arrangement about the lower portion of a wire cage, a flap located at the end of the shield made to loop about a vertical wire of a cage, and means for fastening a portion of the flap adapted to form a stop by coacting with the vertical wire.

4. A bird cage guard comprising a flexible shield for arrangement about the lower portion of a wire cage, and a plurality of staples fastening a portion of the flap to contact with a vertical wire, the flap being hooked about the wire, the flap by its inherent resiliency can be unhooked to remove the shield.

5. A bird cage guard comprising a removable flexible shield for arrangement about a cage, a flap located at each end of the shield, said flap being adapted for hooking the flap about a vertical cage wire, the flap by its inherent resiliency can be unhooked to remove the shield, and means for locking behind another vertical cage wire.

In testimony whereof I have hereunto set my hand.

HENRY O. LINDEMANN.